Nov. 30, 1926.

H. LINWOOD

VEHICLE TIRE

Filed Nov. 4, 1925

1,608,703

Inventor
Harry Linwood
By George J. Henry
Attorney.

Patented Nov. 30, 1926.

1,608,703

UNITED STATES PATENT OFFICE.

HARRY LINWOOD, OF SAN FRANCISCO, CALIFORNIA.

VEHICLE TIRE.

Application filed November 4, 1925. Serial No. 66,626.

My invention has for its object a vehicle tire which is air tight in that it is adapted to retain a requisite internal air pressure at all times without employment of the so-called inner tube heretofore conventionally used.

My tire is self-locking and of simple integral construction and may be mounted or demounted from the vehicle wheel with the greatest ease while securing reliability and continuous operation to a most efficient degree.

Other advantages will be apparent from the drawings and specifications which follow:

Referring to the drawings.

Figure 4:
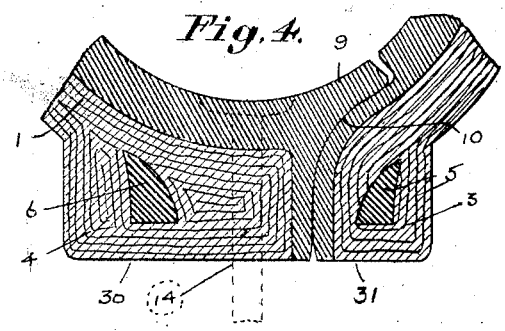
Fig. 4 is a fragmentary cross section of an alternate form of the tire of my invention.
Figure 2:
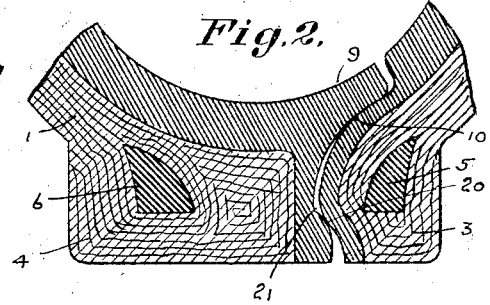
Figs. 2 and 3 are fragmentary cross sections of the tire of Fig. 1, with modifications in the interlocking portions.
Figure 3:
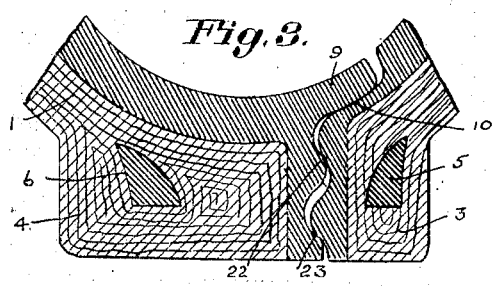

In Figs. 2, 3, and 4 the tire is shown inflated.

Throughout the figures similar numerals refer to identical parts.

A main casing is indicated by the numeral 1, having the tread 2, bead portions 3, 4, and reinforcing bands 5, 6, respectively, all of which are mounted in a conventional manner upon the rim 7 and felloe 8 of any conventional wheel.

It is understood that the casing is built up of rubber and canvas or other suitable impervious resilient material in a conventional way and provided with a rubber lining integral therewith. The casing is parted between the bead portions 3, 4 and along this parting joint I provide the rubber or other flexible expansion member or flap 9 extending into engagement with and seating in the recess 10, formed in the other side of the casing and sealing therewith under air pressure.

These portions 9 and 10 are preferably formed integral with the casing 1 and are made of or provided with a relatively soft rubber or other suitable contacting surfaces.

At 11 I prefer to introduce a tongue of fibre or aluminum or other non-rustable material registering in the recess 12 to facilitate the alignment of the portions 3, 4 and also to prevent dust, dirt and foreign matter from working up through the joint at 12 and damaging the contacting surfaces between 9 and 10.

At 14 is a conventional air tube containing the usual valve whereby air is admitted to the interior 18 of the casing and the casing thereby inflated.

The inflation of the casing causes a heavy pressure in the direction of the arrow 19 against the tongue or flap 9 causing it to contact air tight against the surface 10, and enabling the tire to be inflated and retained in inflated condition.

The manner in which the flap 9 seals against the surface 10 in the several forms of my invention is best shown in Figs. 2, 3 and 4.

Figure 1:
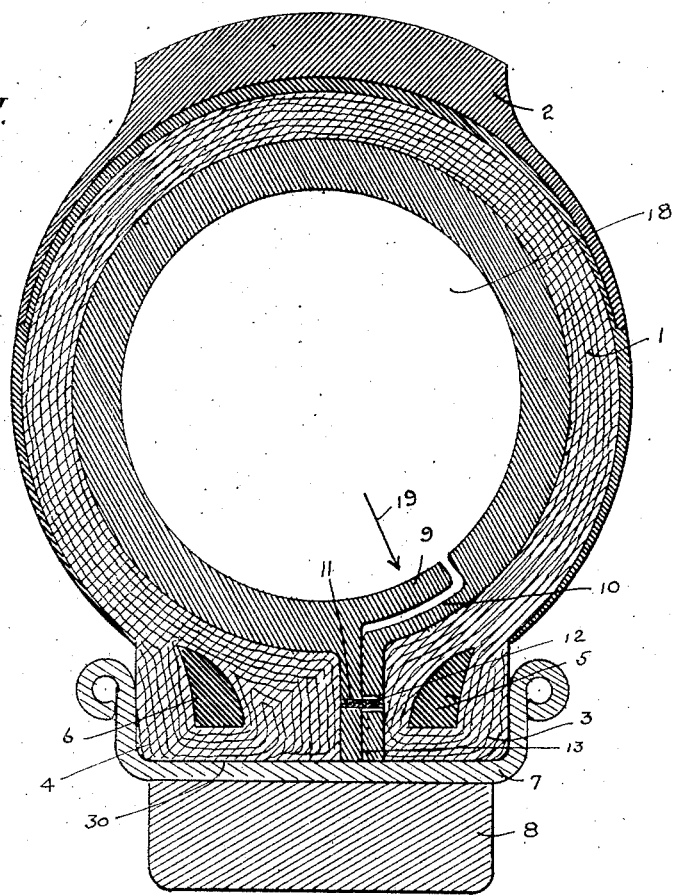
Fig. 1 is a cross section of a tire employing my invention mounted on the rim of a conventional wheel, and in deflated condition, the wheel parts being shown somewhat diagrammatically.

In Fig. 2 I have shown a projection 20 engaging the recess 21, the cooperation of these two elements causing the proper registration of the beads 3 and 4 in the same manner as the tongue 11 of Fig. 1 and with the added advantages that 20 and 21 are molded or otherwise formed in the sides of the tire and provide a second sealing surface in the event of any leakage occurring between the tongue 9 and the surface 10.

In Fig. 3 a plurality of inter-engaging corrugations are provided at 22, 23, respectively.

In Fig. 4 the contact between the surfaces 9 and 10 is relied upon exclusively for the sealing of the air pressure on the inside at 18, the alignment of the surfaces at 30, 31 being secured by their contacting with the wheel rim 7 under the forced pressure, due to the air expansion in 18.

It will now be seen that my invention provides a self-locking air tight, single tube tire of simplest, cheapest and most reliable construction.

I claim:

1. A vehicle tire comprising a hollow annulus formed of material impervious to air, said annulus parted on its inner circumferential wall forming a joint, one of the sides of said joint overlapping the other side of said joint and the two sides of said joint adapted to be held in air-tight contact by air pressure within the annulus and a plurality of corrugations on said sides adapted to interengage when said joint is closed.

2. A vehicle tire comprising a hollow annulus formed of material impervious to air, said annulus parted on its inner circumferential wall forming a joint, one of the sides of said joint overlapping the other side of said joint and the two sides of said joint adapted to be held in air-tight contact by air pressure within the annulus, the contacting surface portions of said joint faced with relatively soft rubber and positioned at one side of a central plane through said annulus.

3. A vehicle tire comprising a hollow annulus formed of material impervious to air, said annulus parted on its inner circumferential wall forming a joint, one of the sides of said joint overlapping the other side of said joint and the two sides of said joint adapted to be held in air-tight contact by air pressure within the annulus, and a plurality of corrugations adapted to interengage when said joint is closed, an inlet tube and valve therein to admit air to the hollow annulus and retain said air compressed therein.

4. A vehicle tire comprising a hollow annulus formed of material impervious to air, said annulus parted on its inner circumferential wall forming a joint, one of the sides of said joint overlapping the other side of said joint and the two sides of said joint adapted to be held in air-tight contact by air pressure within the annulus, the contacting surface portions of said joint faced with relatively soft rubber and positioned at one side of a central plane through said annulus, an inlet tube and valve therein to admit air to the hollow annulus and retain said air compressed therein.

HARRY LINWOOD.